Sept. 19, 1967    S. STEFANUTTI    3,342,362
SHOVEL TILTING DEVICE FOR STATIONARY AND MOVABLE LOADERS
Filed Dec. 17, 1964    4 Sheets-Sheet 1

Sergio Stefanutti
Inventor

By Wenderoth, Lind & Ponack
Attorneys

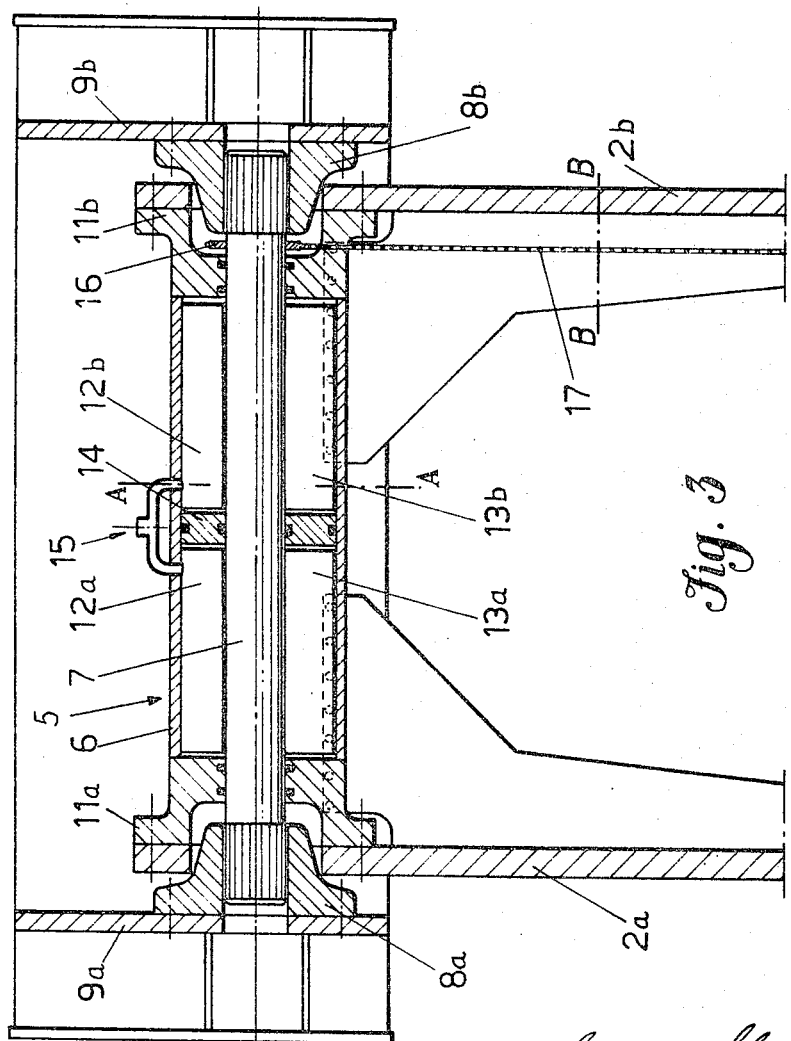

Sept. 19, 1967 S. STEFANUTTI 3,342,362
SHOVEL TILTING DEVICE FOR STATIONARY AND MOVABLE LOADERS
Filed Dec. 17, 1964 4 Sheets-Sheet 3
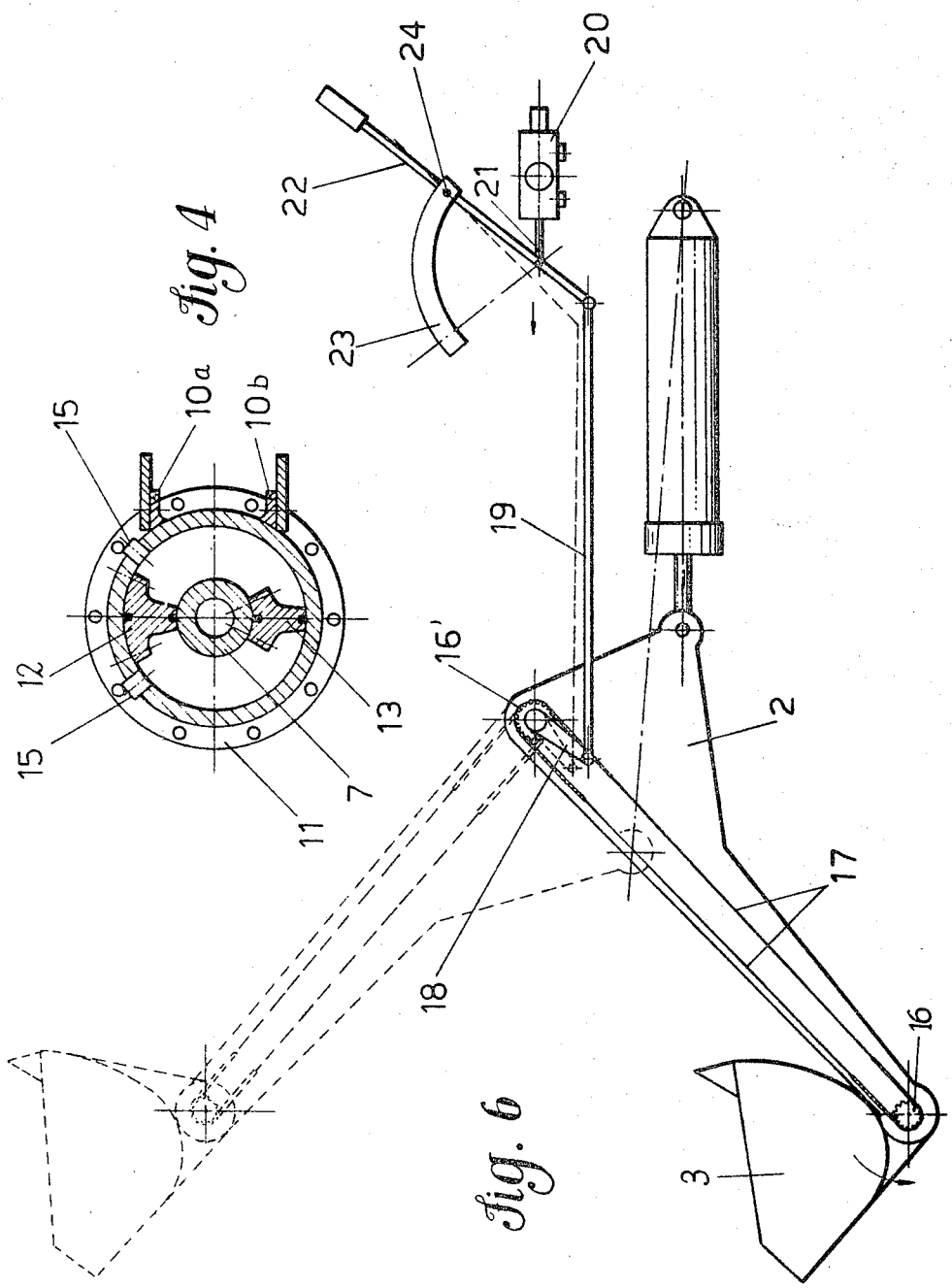

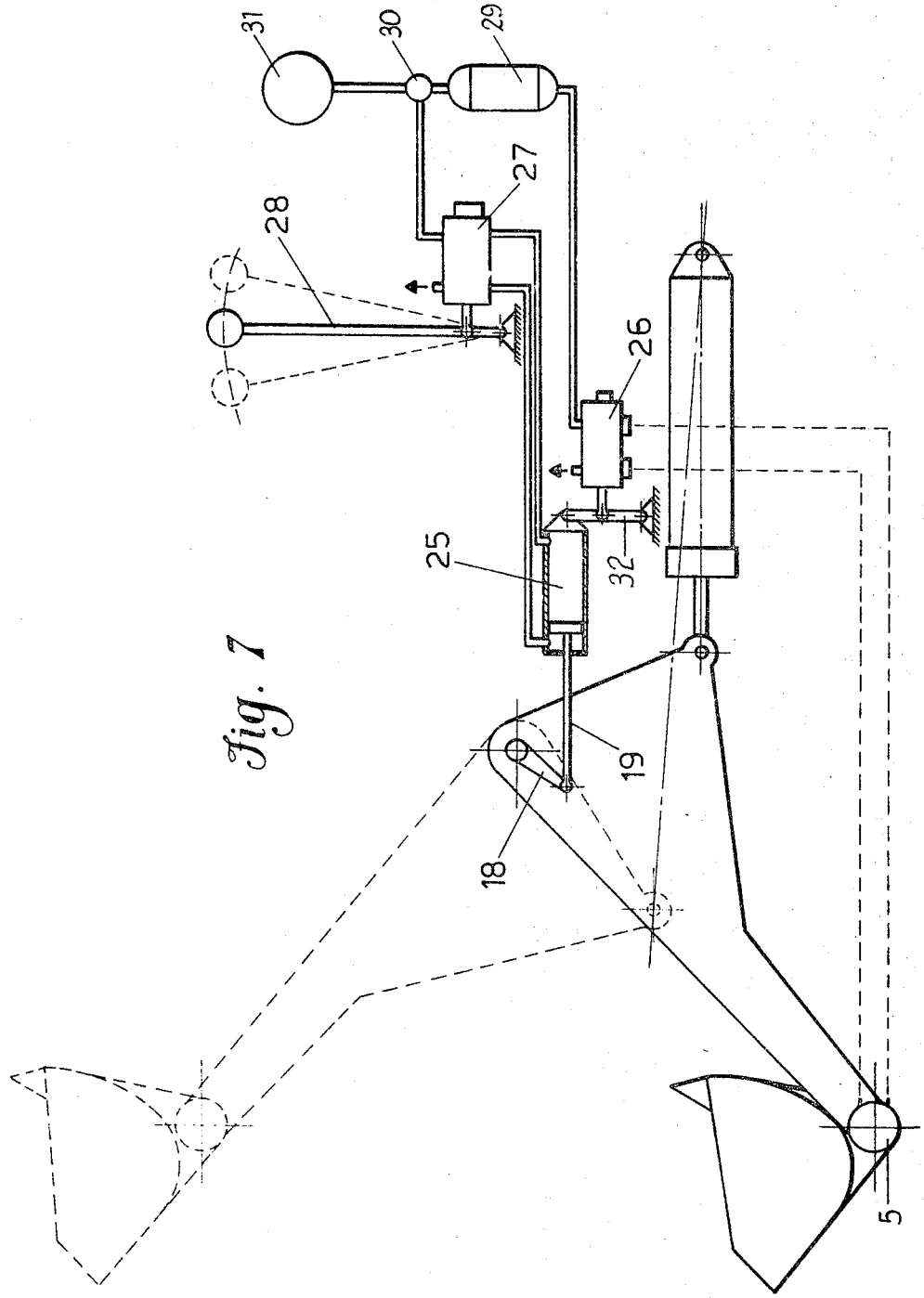

United States Patent Office 3,342,362
Patented Sept. 19, 1967

3,342,362
SHOVEL TILTING DEVICE FOR STATIONARY AND MOVABLE LOADERS
Sergio Stefanutti, Rome, Italy, assignor to Giovannetti Macchine S.p.A., Rome, Italy
Filed Dec. 17, 1964, Ser. No. 419,058
Claims priority, application Italy, Dec. 31, 1963, 26,780/63
3 Claims. (Cl. 214—772)

The present invention relates to a shovel tilting device for stationary and movable loaders.

It is known that loader shovels, and particularly the front shovels mounted on tracked or wheeled trucks, are subjected, during their operation, to two rotational movements:

A tilting movement in order to carry out the material loading and unloading operations.

This movement occurs through a movement extending through about 110–115 degrees.

A second movement in order to maintain the shovel parallel during the lifting and lowering stages of the arms.

The amplitude of this second movement corresponds to the angle described by the arms when moving from the position of maximum lowering to their upmost lifted position.

It is desirable that the maximum angle of the arm rotation should be as wide as possible, as upon said angle, equal to lifting height of the shovel, depends the length of said arms: the greater the lifting angle, and the shorter, and therefore lighter and stronger will be the arms.

Practically, however, this angle will be contained within rather limited limits, due to the impossibility of rotating the shovel through an angle greater, on the whole, than 190°–200°, by the linkages usually used.

Taking account of the tilting movement, there results that the maximum angle available for the parallelism, and therefore for the arm movement, will not exceed, in most loaders, 80°–85°.

Only in certain tired loaders, where the need of short arms is most felt, it has been possible, by rather cumbersome embodiments and sacrificing the amplitude of the tilting movement, to exceed slightly 90°.

The purpose of this invention is to widen the tilting field by substituting one or more rotary cylinders, for the present linkages and cylinders for tilting the shovel, the angle of rotation of said rotary cylinders easily exceeding 220°, allowing thus the arm lifting through an angle of the order of 100–110°.

This invention aims also to dispense with the whole leverage required by the need of parallelism by adopting a simple hydraulic operating device, obtaining thereby also a remarkable simplification of the mechanical unit of the loader.

This invention will be hereinafter described with reference to the attached drawings showing, only by way of non limitative example, one preferred embodiment of the invention itself.

In the drawings:

FIG. 3 shows a longitudinal sectional view of the shovel-arm coupling;

FIG. 4 shows a cross sectional view taken along the line A—A of FIG. 3;

FIG. 5 shows a cross sectional view taken along the line B—B of FIG. 3;

FIG. 6 shows a diagram of the control unit for the parallelism of the shovel;

FIG. 7 shows a modification of the diagram of FIG. 6.

Figure 1:
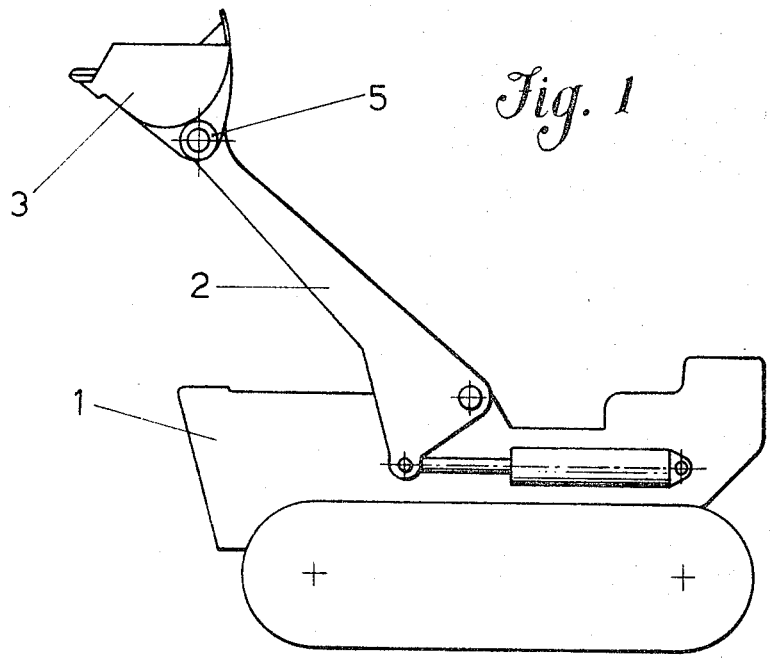
FIG. 1 shows a loader embodied according to this invention, in side elevational view.
Figure 2:
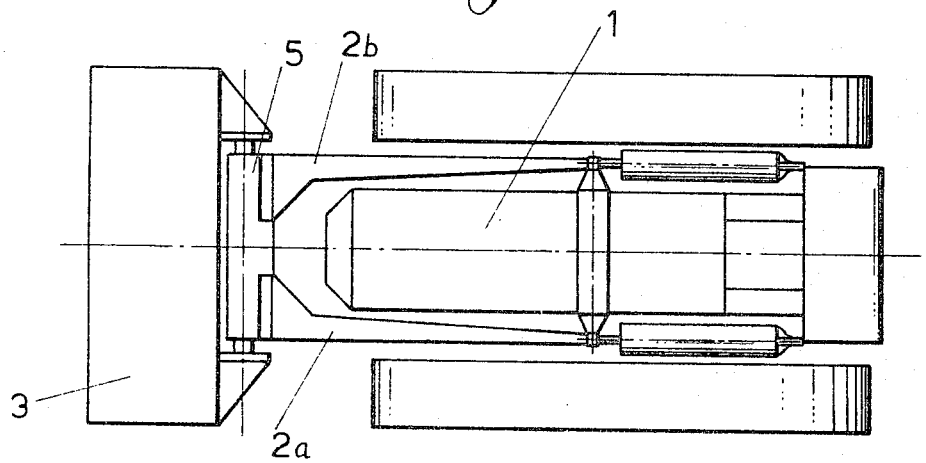
FIG. 2 shows a top plan view of said loader.

With reference to the drawings, the numeral reference 1 denotes, generally, a tracked truck carrying the shovel 3 pivotally connected to the ends of the arms 2 by means of the rotary cylinder 5 the outer barrel 6 of which is rendered rigid with the arms by means of the straight flanges 10a, and 10b, and of the circular end flanges 11a and 11b. The reference a is related to the left hand arm and b to the right hand arm, respectively, when looking at FIG. 3.

The shaft 7 of the rotary cylinder is rendered rigid with the shovel 3 by the connection of the flanges 8a, 8b to the brackets 9a, 9b.

According to the illustrated embodiment, the barrel 6 of the cylinder 5 is rendered rigid with the arms of the loader, completing the resistant structure thereof and embodying a frame having a high rigidity.

Also another embodiment could be made, not shown in this instance, wherein the barrel is rendered rigid with the shovel while the shaft 7 will be rendered rigid with the arms.

This embodiment could be adapted when it is desired to make use of the brackets connecting the cylinder to the shovel, said shovel being equispaced throughout the length of the barrel, in order to obtain a cylinder having a high rigidity and a sufficiently light weight.

The inside of the rotary cylinder 5 contains two sets of blades particularly:

The blades 12a, 12b which are rigid with the barrel 6;

The blades 13a, 13b which are rigid with the shaft 7.

For a better support of the shaft, within the body of the cylinder a diaphragm 14 is mounted, dividing the cylinder into two chambers.

More than one diaphragm may be provided obtaining thus a better support for the shaft and subdividing therefore the blades into a greater number of elements.

The operation of the the rotary cylinder 5 occurs in a known way: the oil, which inflows through one of the ports 15 into one of the two chambers defined by the blades, causes the shaft to rotate causing thus the tilt of the shovel 3.

On the shaft 7 is mounted a sprocket 16 which, through the toothed chain 17 drives the sprocket 16' idly mounted on the pivot pin of either of the arms.

This sprocket 16' is rigid with the lever 18 which in turn controls, through the rod 19 a slide valve of a hydraulic circuit.

According to the diagram illustrated in FIG. 6, the operation of the hydraulic unit is as follows:

If, starting from a rest position, the lever 22 is forward pushed, said lever will rotate about its lower end pivoted on the rod 19 and will cause the slide valve 20 to move, sending thereby the oil to the rotary cylinder 5 in the direction tending to tilt forwards the shovel.

The movement of the shovel will be returned, through the sprocket and the rod 19, to the lower end of the lever 22 which will rearwards move, tending to carry again the slide valve 21 to its neutral position.

The movement of rotation of the shovel will proceed until the pressure on the control lever 22 will continue, as the forwards movement of the slide valve overcomes the rearwards movement produced by the movement of the rod 19; however, as soon as the direct action on the lever 22 will be discontinued, the slide valve will reach again its neutral position and the rotation of the shovel will also discontinue.

This operation, by "return of movement" will be made also for obtaining the parallelism of the shovel during the arm lifting or lowering strokes.

To this purpose, the operation lever 22 is rendered slidable along a sector 23, by means of a friction runner 24, embodied so that its movement will be prevented when the pressure will be exerted on the lower portion of the rod instead of at the handle end. This device 24 is pivoted on the lever 22 by means of a pivot pin allowing the rotation thereof.

The parallelism operation will occur as follows:

When the arms 2 of the loader lift, the shovel 3, which is rigid with said arms 2 (as the slide valve is at its neutral position, and therefore the rotary cylinder is locked), tends to rotate rearwards through an angle equal to that moved through by the arms.

This movement of the shovel will be transmitted to the lever 18 through the sprockets 16, 16' and the chain 17.

The lever 18 will rotate forwardly, driving, through the rod 19, the lower end of the control lever 22.

As this lever 22 is engaged with the sector 23 by means of the runner 24, allowing the rotation thereof, but no displacement, said lever will be compelled to rotate pivoting on the runner 24 so that the slide valve 21 will be moved forwardly.

The displacement of the valve 21 will cause the oil to be admitted to the chamber of the rotary cylinder, to cause forward tilting; this movement will be discontinued as soon as the lever 18 will be brought to its original position, carrying again the slide valve 21 to its neutral position.

Thus, the angle of tilt of the shovel 3 will be always determined by the position imparted to the control lever 22, independently of the position taken by the arms 2.

In a hydraulic circuit embodied according to the above the tilting operation of the shovel will be always of the "return of movement" type.

For a similar embodiment it will be convenient to adopt a similar "return of movement" device also for the lifting movement of the arms; it will be sufficient to pivotally connect a return rod, similar to the rod 19, directly to the body of either of the arms 2.

FIGURE 7 shows a modification of the system which can be adopted when it is not desired to modify the whole hydraulic equipment at present used in most of the loaders, wherein the operation levers control only the valves of the circuits in either direction and do not produce therefore the angular displacements characteristic of the "return of movement" operating devices.

In the diagrammatic view as shown in FIG. 7, the return rod 19 is the piston rod of a cylinder 25, the stroke of which corresponds to the maximum displacement of the rod 19.

The cylinder 25 is operated, through the distributor 27 by the control lever 28 of conventional type.

The rear end of the barrel of the cylinder 25 is hingedly connected to the end of a lever 32 controlling a distributor 26 fed through a circuit different from the general circuit and complying with the general requisites for a "return of movement" operation.

Particularly, the distributor 26 which, differently from the distributors of the type like the distributor 27, is not provided with a by-pass in its neutral position, is fed by a pressurized reservoir 29 which is kept under pressure by the pump 31 through an automatic insertion device 30.

The operation of this unit is as follows:

If the lever 28 is at its neutral position, the cylinder 25 behaves like a rigid rod and the parallelism device operates as previously disclosed.

If the shovel tilting operation is to be effected, the lever 28 will be operated, moving the piston of the cylinder 25 so as to alter the equilibrium position of the lever 18 and therefore the angle of the shovel.

As the cylinder 25 requires a minimum volume, which in most cases does not meet the high delivery of the pump 31, a device is provided for reducing the delivery by means of suitable flow limiting valves, of a type known and which for sake of clarity are not described here. Obviously, the system illustrated in FIGS. 6 and 7 can also be adopted for a "return of movement" control of shovels which are not provided with a rotary cylinder.

The advantages offered by the device as hereinbefore described are remarkable and numerous; only the main advantages will be stressed hereinafter.

(I) Possibility of embodying an angular displacement of the arms through an amplitude remarkably wider than that allowed by the mechanism used at present, embodying thus a remarkable reduction of the length of the arms, and allowing them to be hinged at remarkably more advanced points; this feature is extremely important mainly for the wheeled loaders, wherein the control place is remarkably forward displaced, due to the rear position of the prime mover.

(II) Availability of the entire operating torque for the tilting at all positions taken by the arms and extended throughout the sector of rotation of the shovel and to both directions of rotation.

(III) The entire unit of rods and linkages as required in the conventional loaders can be dispensed with.

(IV) The frame of the truck can be simplified due to the reduction of the anchoring points of the loader as a consequence of the elimination of the hinge points of the cylinder for tilting the shovel.

(V) The arm unit can be constructionally rendered more simple, as the arms can use the body of the rotary cylinder as an element for completing the structure.

(VI) Improvement of the visibility and generally a greater ease of mounting the loader on the truck.

(VII) A greater ease of operation as the driver controls the tilting of the shovel directly through the position of the control lever within its limiting sector (case of the "return of movement" control).

The present invention has been illustrated and described in one preferred embodiment, it being however understood that constructive modifications might be practically adopted without departing from the scope of the claims.

I claim:

1. A device for tilting the shovel on a stationary or movable loader comprising in combination a support carrying the loader, two triangle shaped parallel arms, a horizontal axis rigidly connecting said arms to one another at one triangle apex and rotatably connecting said arms with said support, two first hydraulic cylinders pivoted at one end to said support, two piston stems each cooperating with one of said hydraulic cylinders and pivoted to said arms at the second triangle apex thereof, a rotary shaft connecting said arms to one another at the third apex thereof, a second hydraulic cylinder arranged on said shaft and rigidly connected with said arms, a shovel rigidly connected to said shaft at both ends thereof, at least one diaphragm supporting said shaft within said second hydraulic cylinder and dividing the inner space thereof into at least two chambers, a first and second blade arranged radially to the axis of said shaft within each chamber of said second hydraulic cylinder, one of said blades being rigidly connected with said shaft and the other blade with said second hydraulic cylinder and hydraulic-mechanic means for operating said second hydraulic cylinder for controlling the tilting movement of said shovel in dependence on the angular displacement of said arms.

2. A device for tilting the shovel in a stationary or movable loader as claimed in claim 1, wherein said hydraulic-mechanic means comprise a first sprocket rigidly mounted on said shaft, a second sprocket idly mounted on said horizontal axis, a toothed chain operatively connecting said first and second sprocket to one another, a first lever rigidly connected at one end with said second sprocket to oscillate together therewith around the same axis, an arcuated guide sector rigidly secured to said support, a friction runner arranged to glide on said guide sector, a second lever pivoted to said friction runner at an intermediate point thereof and having a handle at its upper end, a rod pivoted at its one end to said first lever and at its other end to the lower end of said second lever, a slide valve rigidly secured to said support and operatively connected to said second lever at an intermediate point between the lower end thereof and the friction runner for hydraulically controlling said second hydraulic cylinder and thus the tilting movement of said shovel also in dependence on the angular displacement of said arms.

3. A device for tilting the shovel in a stationary or movable loader as claimed in claim 1, wherein said hydraulic-mechanic means comprise a first sprocket rigidly mounted on said shaft, a second sprocket idly mounted on said horizontal axis, a toothed chain operatively connecting said first and second sprocket to one another, a first lever rigidly connected at one end with said second sprocket to oscillate together therewith around the same axis, a third hydraulic cylinder, a piston stem pivoted at one end to said first lever and cooperating at the other end with said third hydraulic cylinder, a second lever pivoted at the lower end to said support and at its other end to said third hydraulic cylinder at the end thereof opposite to said piston stem, a first distributor secured to said support and operatively pivoted to said second lever at an intermediate point thereof, said first distributor being hydraulically connected with said second hydraulic cylinder, a third lever pivoted at one end to said support and having a handle at its other end, a second distributor secured to said support and operatively pivoted to said third lever at an intermediate point thereof, said second distributor being hydraulically connected with said third hydraulic cylinder, a reservoir containing a pressurized hydraulic means and hydraulically connected to said first and second distributor and a pump secured to said support and delivering said reservoir with pressurized hydraulic means.

References Cited

UNITED STATES PATENTS 3,009,590   11/1961   Kampert.

HUGO O. SCHULZ, *Primary Examiner.*